United States Patent
Zhang et al.

(10) Patent No.: US 12,472,796 B2
(45) Date of Patent: Nov. 18, 2025

(54) ELECTRICAL VEHICLE THERMAL MANAGEMENT SYSTEM AND METHOD BASED ON SELF- CIRCULATING GAS-LIQUID PHASE CHANGE COLD PLATE

(71) Applicant: XI'AN JIAOTONG UNIVERSITY, Xi'an (CN)

(72) Inventors: Xiongwen Zhang, Xi'an (CN); Qiang Zhang, Xi'an (CN); Ganglin Cao, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 261 days.

(21) Appl. No.: 18/520,468

(22) Filed: Nov. 27, 2023

(65) Prior Publication Data

US 2024/0116327 A1  Apr. 11, 2024

Related U.S. Application Data

(63) Continuation of application No. PCT/CN2022/091515, filed on May 7, 2022.

(30) Foreign Application Priority Data

May 28, 2021 (CN) .......................... 202110594427.9

(51) Int. Cl.
*B60H 1/00* (2006.01)
*B60H 1/32* (2006.01)

(52) U.S. Cl.
CPC ..... *B60H 1/00392* (2013.01); *B60H 1/00278* (2013.01); *B60H 1/00885* (2013.01);
(Continued)

(58) Field of Classification Search
CPC ............ B60H 1/00392; B60H 1/00278; B60H 1/00885; B60H 1/00899; B60H 1/3227;
(Continued)

(56) References Cited

U.S. PATENT DOCUMENTS

2024/0116327 A1*  4/2024  Zhang ................ B60H 1/00899

FOREIGN PATENT DOCUMENTS

| CN | 108215923 A | 6/2018 |
| CN | 108879019 A | 11/2018 |

(Continued)

*Primary Examiner* — Ljiljana V. Ciric
(74) *Attorney, Agent, or Firm* — Nitin Kaushik

(57) ABSTRACT

An electric vehicle thermal management system and method based on a self-circulating gas-liquid phase change cold plate are disclosed. A top cover, a first heat exchanger, a battery case partition and a battery case bottom plate are arranged in sequence from top to bottom, a top heat exchanging chamber is formed between an upper heat exchanging surface of the first heat exchanger and the top cover; the battery case partition is of a square wave-like structure, a working medium chamber is formed between a top of the battery case partition and a lower heat exchanging surface of the first heat exchanger, the working medium chamber is filled with a gas-liquid phase change working medium, and a plurality of battery chambers are formed between the bottom of the battery case partition and the battery case bottom plate.

9 Claims, 1 Drawing Sheet

(52) U.S. Cl.
CPC ....... *B60H 1/00899* (2013.01); *B60H 1/3227* (2013.01); *B60H 2001/00307* (2013.01); *Y02T 10/70* (2013.01)

(58) Field of Classification Search
CPC ............ B60H 2001/00307; B60K 1/04; B60K 2001/005; B60L 58/26; F25B 29/003; Y02T 10/70
See application file for complete search history.

(56) References Cited

FOREIGN PATENT DOCUMENTS

| | | | | | |
|---|---|---|---|---|---|
| CN | 111129653 | A | * | 5/2020 | ........ H01M 10/6569 |
| CN | 109149002 | B | * | 6/2020 | ........ H01M 10/6556 |
| CN | 111326822 | A | | 6/2020 | |
| CN | 112389155 | A | * | 2/2021 | ......... B60H 1/00571 |
| SE | 534266 | C2 | * | 6/2011 | .............. B60L 50/64 |
| WO | WO-2024015393 | A1 | * | 1/2024 | ........ H01M 10/6557 |

* cited by examiner

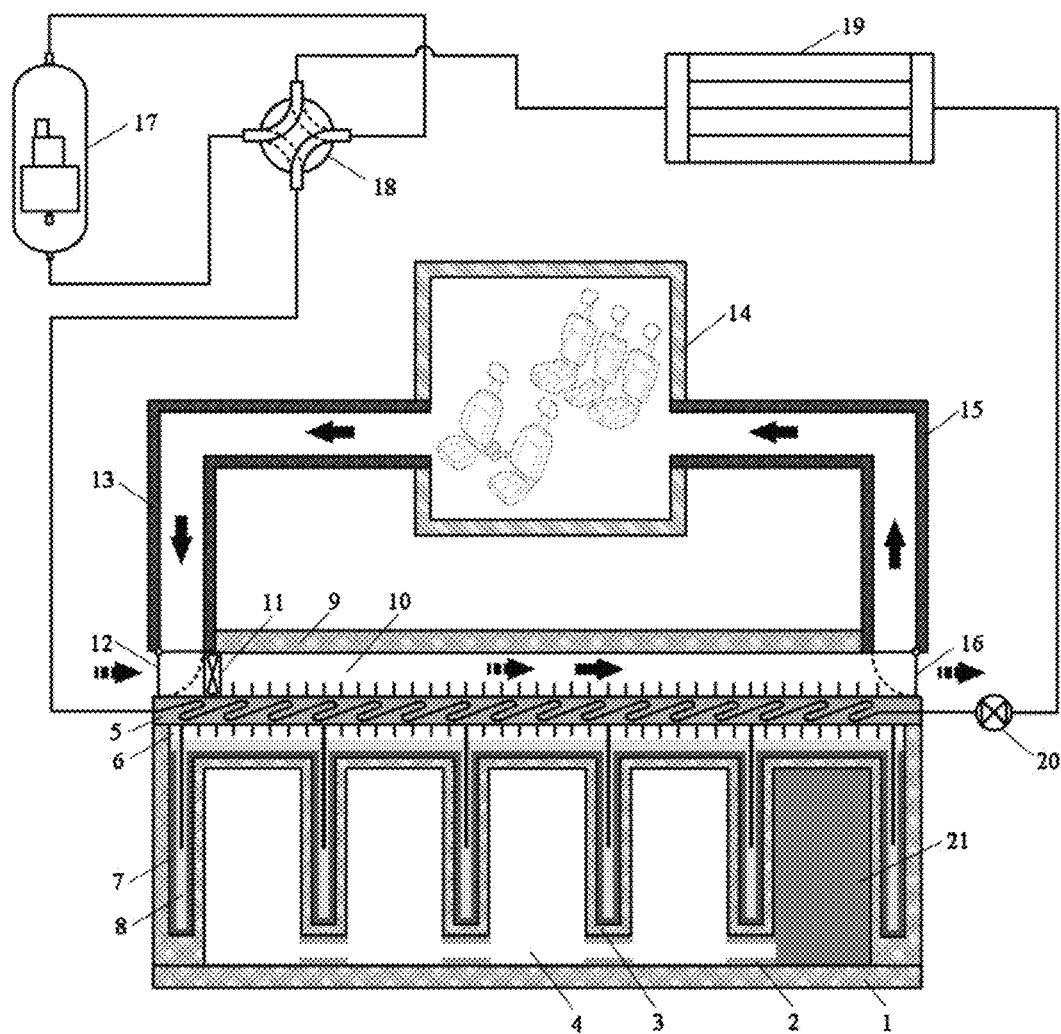

ELECTRICAL VEHICLE THERMAL MANAGEMENT SYSTEM AND METHOD BASED ON SELF-CIRCULATING GAS-LIQUID PHASE CHANGE COLD PLATE

CROSS-REFERENCE TO RELATED APPLICATIONS

The application claims priority to Chinese patent application No. 2021105944279, filed on May 28, 2021, the entire contents of which are incorporated herein by reference.

TECHNICAL FIELD

The present disclosure belongs to the technical field of automobiles, and relates to an electric vehicle thermal management system and method based on a self-circulating gas-liquid phase change cold plate.

BACKGROUND

The electric vehicle thermal management system should keep the battery pack temperature evenly at a reasonable level with as little power consumption as possible, and at the same time provide a suitable temperature for the passenger compartment. Existing air-cooled and liquid-cooled thermal management systems rely on sensible heat exchange of the working medium, the refrigeration is supplemented by an air conditioning system, and the heating mainly relies on less efficient PTC heating, which is difficult to meet future demand in terms of temperature uniformity and energy efficiency. In order to solve these problems, some new principles and methods are gradually being popularized and applied: in the aspect of battery pack temperature control, the latent heat exchange of boiling and condensation of a gas-liquid phase change working medium can meet the requirement of efficient and uniform temperature control in principle; in the aspect of improving energy efficiency, the penetration rate of a heat pump system which can improve heating efficiency by absorbing environmental heat is getting higher and higher in the field of electric vehicles, and the system has a good application prospect. The patent CN108215923A "Thermal Management System for Electric Vehicles" puts forward a thermal management system combining a gas-liquid phase change working medium and a heat pump air conditioner. However, the heat pump of this system does not absorb heat from the environment, but absorbs the heat inside the vehicle, and the system structure is complex, which brings difficulties to control.

SUMMARY

The disclosure aims at overcoming the shortcomings of the prior art, and provides an electric vehicle thermal management system and method based on a self-circulating gas-liquid phase change cold plate. The system and method are simple in structure, and low in cost and can meet the demand of high-efficiency and uniform temperature control.

In order to achieve the above objective, the electric vehicle thermal management system based on a self-circulating gas-liquid phase change cold plate according to the present disclosure includes a top cover, a first heat exchanger, a battery case partition, a battery case bottom plate, a two-position four-way valve, a compressor, a second heat exchanger, an expansion valve, a first air duct, a second air duct, a first damper and a second damper;

the top cover, the first heat exchanger, the battery case partition and the battery case bottom plate are arranged in sequence from top to bottom, a top heat exchanging chamber is formed between an upper heat exchanging surface of the first heat exchanger and the top cover;

one end of the first heat exchanger communicates with a first opening of the four-way two-position valve, a second opening of the four-way two-position valve communicates with a third opening of the four-way two-position valve through the compressor, a fourth opening of the four-way two-position valve communicates with the other end of the first heat exchanger through the second heat exchanger and the expansion valve;

an inlet of the top heat exchanging chamber communicates with an outlet of the first air duct and the external environment through the first damper, an outlet of the top heat exchanging chamber communicates with an inlet of the second air duct and the external environment through the second damper, an inlet of the first air duct and an outlet of the second air duct both communicate with a passenger compartment; and the battery case partition is of a square wave-like structure, a working medium chamber is formed between a top of the battery case partition and a lower heat exchanging surface of the first heat exchanger, the working medium chamber is filled with a gas-liquid phase change working medium, and a plurality of battery chambers are formed between the bottom of the battery case partition and the battery case bottom plate, each battery chamber is provided with a battery pack, and adjacent battery packs are connected by a wire.

The inlet of the top heat exchanging chamber is provided with a fan.

The battery case partition is of a square wave-like structure with wide and narrow alternating lateral spacings.

A surface of the battery case partition is laid with a capillary liquid-guiding core, the capillary liquid-guiding core is located inside the working medium chamber, and the liquid level of the gas-liquid phase change working medium is higher than an upper surface of the capillary liquid-guiding core.

The first heat exchanger includes a flow channel plate and first subsidiary fins of the upper heat exchanging surface and second subsidiary fins and heat conducting ribs of the lower heat exchanging surface, wherein the second subsidiary fins do not come into contact with the liquid working medium in the working medium chamber, and the heat conducting ribs need to penetrate into the liquid working medium.

A side wall of the battery case partition is provided with a wire passing hole for a wire to pass through.

The capillary liquid-guiding core is of a porous medium structure.

The gas-liquid phase change working medium is water, HFE-7000 or HFO-1336mzz(Z).

An electric vehicle thermal management method based on a self-circulating gas-liquid phase change cold plate includes the following steps:

when the battery pack and the passenger compartment need to be cooled, the two-position four-way valve is in a refrigeration position, a heat pump air conditioner starts an air conditioning mode, at this time, the first heat exchanger is an evaporator, the second heat exchanger is a condenser, the first damper is switched to enable the inlet of the top heat exchanging chamber to communicate with the outlet of the first air duct, the second damper is switched to enable the outlet of the top heat exchanging chamber to communicate with the inlet of the second air duct, heat generated by the battery pack is transferred to the gas-liquid phase change working medium in the capillary liquid-guiding core through the battery case partition, causing the gas-liquid phase change working medium to boil and evaporate, wherein the generated vapor rises to contact with the lower heat exchanging surface and the second subsidiary fins of the first heat exchanger, then condenses into a liquid state and falls back into the working medium chamber, meanwhile, an air-conditioning circulating working medium in the first heat exchanger absorbs heat, at the same time, under the driving of the fan, the air in the passenger compartment flows over the upper heat exchanging surface and the first subsidiary fins of the first heat exchanger, and transfers heat to the air-conditioning circulating working medium in the first heat exchanger, the air-conditioning circulating working medium in the first heat exchanger changes from a liquid state to a gaseous state after absorbing heat, wherein, the generated gas condenses into a liquid working medium in the second heat exchanger after being compressed by the compressor, and then enters the first heat exchanger through the expansion valve;

when the battery pack and the passenger compartment need to be heated, the two-position four-way valve is in the heating position, the heat pump air conditioner starts a heat pump mode, at this time, the first heat exchanger is a condenser, the second heat exchanger is an evaporator, the first damper is switched to enable the inlet of the top heat exchanging chamber to communicate with the outlet of the first air duct, the second damper is switched to enable the outlet of the top heat exchanging chamber to communicate with the inlet of the second air duct, the heat pump circulating working medium releases heat and condenses in the second heat exchanger, and the released heat is transferred to the upper heat exchanging surface and the lower heat exchanging surface, wherein the air in the top heat exchanging chamber is heated by part of the heat through the upper heat exchanging surface and the first subsidiary fins, and the air in the top heat exchanging chamber is heated and enters the passenger compartment to release heat, and then is returned to the top heat exchanging chamber, the other part of heat heats the gas-liquid phase change working medium in the working medium chamber by the heat conducting ribs, the gas-liquid phase change working medium in the working medium chamber absorbs the heat and then transfers the heat to the battery pack through the capillary liquid-guiding core and the battery case partition, in addition, the heat pump circulating working medium is condensed in the first heat exchanger, and then enters the second heat exchanger to absorb the environmental heat and evaporate after being decompressed by the expansion valve, and the generated gas is compressed by the compressor and then returned to the first heat exchanger to complete the circulation; and when the passenger compartment does not need temperature regulation and the battery pack needs cooling, the first damper is switched to enable the inlet of the top heat exchanging chamber to communicate with the external environment, the second damper is switched to enable the outlet of the top heat exchanging chamber to communicate with the external environment, the heat generated by the battery pack passes through the battery case partition and is transferred to the gas-liquid phase change working medium in the capillary liquid-guiding core, which causes the phase-change gasification of the gas-liquid phase change working medium in the capillary liquid-guiding core, wherein, the generated vapor rises to contact with the lower heat exchanging surface and the second subsidiary fins of the first heat exchanger and then condenses into a liquid state and falls back into the working medium chamber, the heat released by condensation is transferred to the upper heat exchanging surface and the first subsidiary fins of the first heat exchanger through the heat pump circulating working medium in the first heat exchanger, at the same time, the air in the external environment flows over the upper heat exchanging surface and the first subsidiary fins of the first heat exchanger, and then the heat is taken away and discharged into the external environment; when the ambient air is insufficient to adequately remove the heat of the battery pack, the refrigeration mode of the air conditioning heat pump is started, at this time, the first damper is switched to enable the inlet of the top heat exchanging chamber to communicate with the outlet of the first air duct, and the second damper is switched to enable the outlet of the top heat exchanging chamber to communicate with the inlet of the second air duct, since the passenger compartment does not need temperature regulation, the cooling energy generated by evaporation of the air-conditioning circulating working medium through the second heat exchanger is used to cool the battery pack.

The present disclosure has the following beneficial effects:

in specific operation of the electric vehicle thermal management system and method based on a self-circulating gas-liquid phase change cold plate of the disclosure, the temperature adjustment of the passenger compartment and the battery pack shares a first heat exchanger to reduce system complexity, volume and weight, and the first heat exchanger takes into account the air cooling mode, which is beneficial to reducing power consumption. In addition, the disclosure adopts the latent heat exchange principle of the gas-liquid phase change working medium to cool the battery pack, so as to ensure the high-efficiency and uniform heat exchange demand, and at the same time, the battery pack is not directly immersed in the gas-liquid phase change working medium, but the indirect contact mode of a battery case partition is adopted, which is beneficial to realizing sealing and reducing manufacturing and maintenance costs. Finally, the disclosure adopts the heat pump air conditioner, which has higher energy efficiency compared with the prior PTC heating mode, and is beneficial to prolonging the endurance of the electric vehicle under the low temperature environment.

BRIEF DESCRIPTION OF DRAWINGS

FIG. 1 is a structural schematic diagram of the present disclosure.

Wherein, 1 is the battery case bottom plate, 2 is the wire passing hole, 3 is the battery case partition, 4 is the battery chamber, 5 is the first heat exchanger, 6 is the working medium chamber, 7 is the capillary liquid-guiding core, 8 is the gas-liquid phase change working medium. 9 is the top cover, 10 is the top heat exchange chamber, 11 is the fan, 12 is the first damper, 13 is the first air duct, 14 is the passenger compartment, 15 is the second air duct, 16 is the second damper, 17 is the compressor, 18 is the two-position four-way valve, 19 is the second heat exchanger, 20 is the expansion valve, and 21 is the battery pack.

DETAILED DESCRIPTION OF THE EMBODIMENTS

In order to make those skilled in the art better understand the solutions of the disclosure, the technical solutions in the embodiments of the present disclosure will be described clearly and completely below in conjunction with the accompanying drawings in the embodiments of the present disclosure, it is obvious that the described embodiments are only some, but not all, embodiments of the present disclosure, and are not intended to limit the scope of the disclosure of the present disclosure. Additionally, in the following description, a description of well-known structures and techniques is omitted to avoid unnecessary confusion of the disclosed concepts of the present disclosure. Based on the embodiments in the present disclosure, all other embodiments obtained by those of ordinary skill in the art without making creative efforts should fall within the scope of protection of the present disclosure.

A structural schematic diagram according to an embodiment of the present disclosure is shown in the accompanying drawing. The drawing is not drawn to scale, wherein certain details have been enlarged and certain details may have been omitted for the purpose of clarity. The shapes of the various regions and layers and the relative sizes, positional relationships between them shown in the drawing are merely exemplary, may vary in practice due to manufacturing tolerances or technical limitations, and those skilled in the art may otherwise design regions/layers having different shapes, sizes, relative positions according to actual needs.

Referring to FIG. 1, the electric vehicle thermal management system based on a self-circulating gas-liquid phase change cold plate according to the present disclosure includes a battery case bottom plate 1, a wire passing hole 2, a battery case partition 3, a battery chamber 4, a first heat exchanger 5, a working medium chamber 6, a capillary liquid-guiding core 7, a gas-liquid phase change working medium 8, a top cover 9, a top heat exchanging chamber 10, a fan 11, a first damper 12, a first air duct 13, a passenger compartment 14, a second air duct 15, a second damper 16, a compressor 17, a two-position four-way valve 18, a second heat exchanger 19, an expansion valve 20, and a battery pack 21;

wherein, the top cover 9, the first heat exchanger 5, the battery case partition 3 and the battery case bottom plate 1 are arranged in sequence from top to bottom, a top heat exchanging chamber 10 is formed between an upper heat exchanging surface of the first heat exchanger 5 and the top cover 9, a working medium chamber 6 is formed between a lower heat exchanging surface of the first heat exchanger 5 and the battery case partition 3 and battery chambers 4 are formed between the battery case partition 3 and the battery case bottom plate 1. One end of the first heat exchanger 5 communicates with a first opening of the four-way two-position valve 18, a second opening of the four-way two-position valve 18 communicates with a third opening of the four-way two-position valve 18 through the compressor 17, a fourth opening of the four-way two-position valve 18 communicates with the other end of the first heat exchanger 5 through the second heat exchanger 19 and the expansion valve 20, thus forming a heat pump air conditioning system.

The inlet of the top heat exchanging chamber 10 is provided with a fan 11, an inlet of the top heat exchanging chamber 10 communicates with an outlet of the first air duct 13 and the external environment through the first damper 12, and the first damper 12 is used for switching and controlling the inlet of the top heat exchanging chamber 10 to communicate with the outlet of the first air duct 13 or the environment, an outlet of the top heat exchanging chamber 10 communicates with an inlet of the second air duct 15 and the external environment through the second damper 16, the outlet of the top heat exchanging chamber 10 is switched and controlled to communicate with the inlet of the second air duct 15 and the environment through the second damper 16, an inlet of the first air duct 13 communicates with an outlet of the passenger compartment 14, and an outlet of the second air duct 15 communicates with an inlet of the passenger compartment 14.

In operation, when the two-position four-way valve 18 is in a refrigeration position, an inlet of the compressor 17 communicates with the first heat exchanger 5 and an outlet of the compressor 17 communicates with the second heat exchanger 19, at this time, the first heat exchanger 5 is an evaporator and the second heat exchanger 19 is a condenser; when the two-position four-way valve 18 is in a heating position, the inlet of the compressor 17 communicates with the second heat exchanger 19 and the outlet of the compressor 17 communicates with the first heat exchanger 5, at this time, the second heat exchanger 19 is an evaporator and the first heat exchanger 5 is a condenser.

The battery case partition 3 is of a square wave-like structure with wide and narrow alternating lateral spacings. An opening of a narrow gap of the battery case partition 3 is directed toward the lower heat exchanging surface of the first heat exchanger 5, and an opening of a wide gap of the battery case partition 3 is directed toward the battery case bottom plate 1. A closed working medium chamber 6 is formed between the battery case partition 3 and the lower heat exchanging surface of the first heat exchanger 5, and a capillary liquid-guiding core 7 is laid on the surface of the battery case partition 3 in the working medium chamber 6, and the capillary liquid-guiding core 7 is located in the working medium chamber 6, and the working medium chamber 6 is filled with a gas-liquid phase change working medium 8, and the liquid level of the working medium is higher than an upper surface of the capillary liquid-guiding core 7. A plurality of battery chambers 4 which are relatively independent are formed between the battery case partition 3 and the battery case bottom plate 1, and each battery chamber 4 is connected in series and in parallel by the wire passing hole 2 passing through the narrow gap of the battery case partition 3. When the battery pack 21 is placed in the battery chamber 4, the side walls and the top of the battery pack 21 are closely fitted with the battery case partition 3, and heat exchange is realized through the battery case partition 3 and the gas-liquid phase change working medium 8 in the capillary liquid-guiding core 7.

The first heat exchanger 5 includes a flow channel plate, wherein a serpentine flow channel is arranged in the flow channel plate, an upper surface of the flow channel plate is an upper heat exchanging surface, a lower surface of the flow channel plate is a lower heat exchanging surface, wherein first subsidiary fins are provided on the upper heat exchanging surface, and second subsidiary fins and heat conducting ribs are provided on the lower heat exchanging surface, wherein the lower end of the second subsidiary fin is not in direct contact with the working medium in the working medium chamber 6, the heat conducting rib is provided only at a position corresponding to the narrow gap of the battery case partition 3, the thickness of the heat conducting rib is large to ensure a high heat-conducting rate, the length of the heat-conducting rib is long and is required to penetrate into the working medium in the narrow gap, and the lower end of the second subsidiary fin is located at about half the depth of the narrow gap.

The capillary liquid-guiding core 7 is of a porous medium structure, and the porous medium structure has the moisture absorbing and liquid-guiding property to the gas-liquid phase change working medium 8, so that the gas-liquid phase change working medium 8 can be uniformly distributed when the battery case is inclined.

The gas-liquid phase change working medium 8 is water or another refrigerant, such as HFE-7000, HFO-1336mzz (Z), or the like.

The electric vehicle thermal management method based on a self-circulating gas-liquid phase change cold plate according to the present disclosure includes the following steps:

when the battery pack 21 and the passenger compartment 14 need to be cooled, the two-position four-way valve 18 is in a refrigeration position, a heat pump air conditioner starts an air conditioning mode, at this time, the first heat exchanger 5 is an evaporator, the second heat exchanger 19 is a condenser, the first damper 12 is switched to enable the inlet of the top heat exchanging chamber 10 to communicate with the outlet of the first air duct 13, the second damper 16 is switched to enable the outlet of the top heat exchanging chamber 10 to communicate with the inlet of the second air duct 15, heat generated by the battery pack 21 is transferred to the gas-liquid phase change working medium 8 in the capillary liquid-guiding core 7 through the battery case partition 3, causing the gas-liquid phase change working medium 8 to boil and evaporate, wherein the generated vapor rises to contact with the lower heat exchanging surface and the second subsidiary fins of the first heat exchanger 5, then condenses into a liquid state and falls back into the working medium chamber 6, meanwhile, an air-conditioning circulating working medium in the first heat exchanger 5 absorbs heat, at the same time, under the driving of the fan 11, the air in the passenger compartment 14 flows over the upper heat exchanging surface and the first subsidiary fins of the first heat exchanger 5, and transfers heat to the air-conditioning circulating working medium in the first heat exchanger 5, the air-conditioning circulating working medium in the first heat exchanger 5 changes from a liquid state to a gaseous state after absorbing heat, wherein, the generated gas condenses into a liquid working medium in the second heat exchanger 19 after being compressed by the compressor 17, and then enters the first heat exchanger 5 through the expansion valve 20;

when the battery pack 21 and the passenger compartment 14 need to be heated, the two-position four-way valve 18 is in the heating position, the heat pump air conditioner starts a heat pump mode, at this time, the first heat exchanger 5 is a condenser, the second heat exchanger 19 is an evaporator, the first damper 12 is switched to enable the inlet of the top heat exchanging chamber 10 to communicate with the outlet of the first air duct 13, the second damper 16 is switched to enable the outlet of the top heat exchanging chamber 10 to communicate with the inlet of the second air duct 15, the heat pump circulating working medium releases heat and condenses in the second heat exchanger 19, and the released heat is transferred to the upper heat exchanging surface, the lower heat exchanging surface, the first subsidiary fins, the second subsidiary fins, and the heat-conducting ribs so as to heat the gas-liquid phase change working medium 8 in the working medium chamber 6 and the air in the top heat exchanging chamber 10, and the air in the top heat exchanging chamber 10 is heated and enters the passenger compartment 14 to release heat, and then is returned to the top heat exchanging chamber 10; the gas-liquid phase change working medium 8 in the working medium chamber 6 absorbs the heat and then transfers the heat to the battery pack 21 through the capillary liquid-guiding core 7 and the battery case partition 3, in addition, the heat pump circulating working medium is condensed in the first heat exchanger 5, and then enters the second heat exchanger 19 to absorb the environmental heat and evaporate after being decompressed by the expansion valve 20, and the generated gas is compressed by the compressor 17 and then returned to the first heat exchanger 5 to complete the circulation; and when the passenger compartment 14 does not need temperature regulation and the battery pack 21 needs cooling, the first damper 12 is switched to enable the inlet of the top heat exchanging chamber 10 to communicate with the external environment, the second damper 16 is switched to enable the outlet of the top heat exchanging chamber 10 to communicate with the external environment, the heat generated by the battery pack 21 passes through the battery case partition 3 and is transferred to the gas-liquid phase change working medium 8 in the capillary liquid-guiding core 7, which causes the phase-change gasification of the gas-liquid phase change working medium 8 in the capillary liquid-guiding core 7, wherein, the generated vapor rises to contact with the lower heat exchanging surface and the second subsidiary fins of the first heat exchanger 5 and then condenses into a liquid state and falls back into the working medium chamber 6, the heat released by condensation is transferred to the upper heat exchanging surface and the first subsidiary fins of the first heat exchanger 5 through the heat pump circulating working medium in the first heat exchanger 5, at the same time, the air in the external environment is introduced via the fan 11 and flows over the upper heat exchanging surface and the first subsidiary fins of the first heat exchanger 5, and then the heat is taken away and discharged into the external environment; when the ambient air is insufficient to adequately remove the heat of the battery pack 21, the refrigeration mode of the air conditioning heat pump is started, at this time, the first damper 12 is switched to enable the inlet of the top heat exchanging chamber 10 to communicate with the outlet of the first air duct 13, and the second damper 16 is switched to enable the outlet of the top heat exchanging chamber 10 to communicate with the inlet of the second air duct 15, since the passenger compartment 14 does not need temperature regulation, the cooling energy generated by evaporation of the air-conditioning circulating working medium through the second heat exchanger 19 is used to cool the battery pack 21.

What is claimed is:

1. An electric vehicle thermal management system based on a self-circulating gas-liquid phase change cold plate, comprising a top cover (9), a first heat exchanger (5), a battery case partition (3), a battery case bottom plate (1), a two-position four-way valve (18), a compressor (17), a second heat exchanger (19), an expansion valve (20), a first air duct (13), a second air duct (15), a first damper (12) and a second damper (16); wherein the top cover (9), the first heat exchanger (5), the battery case partition (3) and the battery case bottom plate (1) are arranged in sequence from top to bottom, a top heat exchanging chamber (10) is formed between an upper heat exchanging surface of the first heat exchanger (5) and the top cover (9);

one end of the first heat exchanger (5) communicates with a first opening of the four-way two-position valve (18), a second opening of the four-way two-position valve (18) communicates with a third opening of the four-way two-position valve (18) through the compressor (17), a fourth opening of the four-way two-position valve (18) communicates with the other end of the first heat exchanger (5) through the second heat exchanger (19) and the expansion valve (20);

an inlet of the top heat exchanging chamber (10) communicates with an outlet of the first air duct (13) and the external environment through the first damper (12), an outlet of the top heat exchanging chamber (10) communicates with an inlet of the second air duct (15) and the external environment through the second damper (16), an inlet of the first air duct (13) and an outlet of the second air duct (15) both communicate with a passenger compartment (14); and the battery case partition (3) is of a square wave-like structure, a working medium chamber (6) is formed between a top of the battery case partition (3) and a lower heat exchanging surface of the first heat exchanger (5), the working medium chamber (6) is filled with a gas-liquid phase change working medium (8), and a plurality of battery chambers (4) are formed between the bottom of the battery case partition (3) and the battery case bottom plate (1), each battery chamber (4) is provided with a battery pack (21), and adjacent battery packs (21) are connected by a wire.

2. The electric vehicle thermal management system based on a self-circulating gas-liquid phase change cold plate according to claim 1, wherein the inlet of the top heat exchanging chamber (10) is provided with a fan (11).

3. The electric vehicle thermal management system based on a self-circulating gas-liquid phase change cold plate according to claim 1, wherein the battery case partition (3) is of a square wave-like structure with wide and narrow alternating lateral spacings.

4. The electric vehicle thermal management system based on a self-circulating gas-liquid phase change cold plate according to claim 1, wherein a surface of the battery case partition (3) is laid with a capillary liquid-guiding core (7), the capillary liquid-guiding core (7) is located inside the working medium chamber (6), and the liquid level of the gas-liquid phase change working medium (8) is higher than an upper surface of the capillary liquid-guiding core (7).

5. The electric vehicle thermal management system based on a self-circulating gas-liquid phase change cold plate according to claim 1, wherein the first heat exchanger (5) comprises a flow channel plate and first subsidiary fins of the upper heat exchanging surface and second subsidiary fins and heat conducting ribs of the lower heat exchanging surface, wherein the second subsidiary fins do not come into contact with the liquid working medium (8) in the working medium chamber (6), and the heat conducting ribs need to penetrate into the liquid working medium (8).

6. The electric vehicle thermal management system based on a self-circulating gas-liquid phase change cold plate according to claim 1, wherein a side wall of the battery case partition (3) is provided with a wire passing hole (2) for a wire to pass through.

7. The electric vehicle thermal management system based on a self-circulating gas-liquid phase change cold plate according to claim 1, wherein the capillary liquid-guiding core (7) is of a porous medium structure.

8. The electric vehicle thermal management system based on a self-circulating gas-liquid phase change cold plate according to claim 1, wherein the gas-liquid phase change working medium (8) is water, HFE-7000 or HFO-1336mzz (Z).

9. An electric vehicle thermal management method based on a self-circulating gas-liquid phase change cold plate, wherein, based on the electric vehicle thermal management system based on a self-circulating gas-liquid phase change cold plate according to claim 1, the method comprises the following steps:

when the battery pack (21) and the passenger compartment (14) need to be cooled, the two-position four-way valve (18) is in a refrigeration position, a heat pump air conditioner starts an air conditioning mode, at this time, the first heat exchanger (5) is an evaporator, the second heat exchanger (19) is a condenser, the first damper (12) is switched to enable the inlet of the top heat exchanging chamber (10) to communicate with the outlet of the first air duct (13), the second damper (16) is switched to enable the outlet of the top heat exchanging chamber (10) to communicate with the inlet of the second air duct (15), heat generated by the battery pack (21) is transferred to the gas-liquid phase change working medium (8) in the capillary liquid-guiding core (7) through the battery case partition (3), causing the gas-liquid phase change working medium (8) to boil and evaporate, wherein the generated vapor rises to contact with the lower heat exchanging surface and the second subsidiary fins of the first heat exchanger (5), then condenses into a liquid state and falls back into the working medium chamber (6), meanwhile, an air-conditioning circulating working medium in the first heat exchanger (5) absorbs heat, at the same time, under the driving of the fan (11), the air in the passenger compartment (14) flows over the upper heat exchanging surface and the first subsidiary fins of the first heat exchanger (5), and transfers heat to the air-conditioning circulating working medium in the first heat exchanger (5), the air-conditioning circulating working medium in the first heat exchanger (5) changes from a liquid state to a gaseous state after absorbing heat, wherein, the generated gas condenses into a liquid working medium in the second heat exchanger (19) after being compressed by the compressor (17), and then enters the first heat exchanger (5) through the expansion valve (20);

when the battery pack (21) and the passenger compartment (14) need to be heated, the two-position four-way valve (18) is in the heating position, the heat pump air conditioner starts a heat pump mode, at this time, the first heat exchanger (5) is a condenser, the second heat exchanger (19) is an evaporator, the first damper (12) is switched to enable the inlet of the top heat exchanging chamber (10) to communicate with the outlet of the first air duct (13), the second damper (16) is switched to enable the outlet of the top heat exchanging chamber (10) to communicate with the inlet of the second air duct (15), the heat pump circulating working medium releases heat and condenses in the second heat exchanger (19), and the released heat is transferred to the upper heat exchanging surface and the lower heat exchanging surface, wherein the air in the top heat exchanging chamber (10) is heated by part of the heat through the upper heat exchanging surface and the first subsidiary fins, and the air in the top heat exchanging chamber (10) is heated and enters the passenger compartment (14) to release heat, and then is returned to the top heat exchanging chamber (10); the other part of heat heats the gas-liquid phase change working medium (8) in the working medium chamber (6) by the heat conducting ribs, the gas-liquid phase change working medium (8) in the working medium chamber (6) absorbs the heat and then transfers the heat to the battery pack (21) through the capillary liquid-guiding core (7) and the battery case partition (3), in addition, the heat pump circulating working medium is condensed in the first heat exchanger (5), and then enters the second heat exchanger (19) to absorb the environmental heat and evaporate after being decompressed by the expansion valve (20), and the generated gas is compressed by the compressor (17) and then returned to the first heat exchanger (5) to complete the circulation; and when the passenger compartment (14) does not need temperature regulation and the battery pack (21) needs cooling, the first damper (12) is switched to enable the inlet of the top heat exchanging chamber (10) to communicate with the external environment, the second damper (16) is switched to enable the outlet of the top heat exchanging chamber (10) to communicate with the external environment, the heat generated by the battery pack (21) passes through the battery case partition (3) and is transferred to the gas-liquid phase change working medium (8) in the capillary liquid-guiding core (7), which causes the phase-change gasification of the gas-liquid phase change working medium (8) in the capillary liquid-guiding core (7), wherein, the generated vapor rises to contact with the lower heat exchanging surface and the second subsidiary fins of the first heat exchanger (5) and then condenses into a liquid state and falls back into the working medium chamber (6), the heat released by condensation is transferred to the upper heat exchanging surface and the first subsidiary fins of the first heat exchanger (5) through the heat pump circulating working medium in the first heat exchanger (5), at the same time, the air in the external environment flows over the upper heat exchanging surface and the first subsidiary fins of the first heat exchanger (5), and then the heat is taken away and discharged into the external environment; when the ambient air is insufficient to adequately remove the heat of the battery pack (21), the refrigeration mode of the air conditioning heat pump is started, at this time, the first damper (12) is switched to enable the inlet of the top heat exchanging chamber (10) to communicate with the outlet of the first air duct (13), and the second damper (16) is switched to enable the outlet of the top heat exchanging chamber (10) to communicate with the inlet of the second air duct (15), since the passenger compartment (14) does not need temperature regulation, the cooling energy generated by evaporation of the air-conditioning circulating working medium through the second heat exchanger (19) is used to cool the battery pack (21).

\* \* \* \* \*